/ Patented Aug. 17, 1926.

1,596,120

UNITED STATES PATENT OFFICE.

ROBERT W. POINDEXTER, JR., OF LOS ANGELES, CALIFORNIA, ASSIGNOR TO CALIFORNIA CYANIDE COMPANY, INCORPORATED, OF NEW YORK, N. Y., A CORPORATION OF DELAWARE.

CYANIDE PRODUCT AND PROCESS OF PREPARING THE SAME.

No Drawing.   Application filed April 13, 1926.   Serial No. 101,831.

This invention relates to cyanide compounds and to a process of preparing such compounds. In the following specification reference is made more particularly to compounds of calcium as an example of the application of the invention and as a type of the products which can be prepared.

It has been generally recognized in the art that the cyanide of calcium cannot be prepared in a solid and substantially pure form. It is known that solutions of calcium cyanide $Ca(CN)_2$ can be produced by adding hydrocyanic acid to a suspension of calcium hydroxide or by the double decomposition of appropriate aqueous solutions such, for example, as solutions of calcium sulphate and barium cyanide. In this case barium sulphate is precipitated, leaving calcium cyanide in solution. The attempt to recover the calcium cyanide in a solid form by evaporation of the solution always results in a decomposition with an evolution of hydrocyanic acid so that only calcium hydroxide remains.

Metzger has recently devised a process of preparing cyanide compounds by the action of hydrocyanic acid upon the carbide. He produces, for example, a calcium cyanide product having the formula

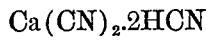

$$Ca(CN)_2.2HCN$$

by treating calcium carbide with hydrocyanic acid. The product of the present invention has some of the properties of the calcium cyanide product developed by Metzger but is specifically differentiated therefrom in chemical composition. Both products have the property of decomposing when freely exposed to the atmosphere to produce hydrocyanic acid. Consequently, the product herein described is applicable to such uses as fumigation for the control and extermination of insect and animal pests. It can be used also in processes for the extraction of metals from their ores, for the manufacture of other cyanogen compounds, for the improvement of electrolytic baths and for other purposes.

It is the object of the invention to provide cyanide compounds of the metals and particularly calcium in a solid form in which they are readily applicable for various uses and to afford a simple and convenient process for the preparation of such compounds.

Other objects and advantages of the invention will be understood by reference to the following specification including a specific example of the process as applied to the production of calcium compounds.

The process whereby the desired cyanogen compounds are produced includes the use of anhydrous liquid ammonia as the vehicle for the reaction. Thus, a suitable salt of the metal to be converted into a cyanide is dissolved in commercial anhydrous liquid ammonia. To this may be added either hydrocyanic acid or a solution of ammonium cyanide in commercial anhydrous liquid ammonia. Any other cyanide which is soluble in the liquid ammonia can be substituted for ammonium cyanide or hydrocyanic acid. When hydrocyanic acid is added to anhydrous liquid ammonia or to a solution of a suitable salt in the liquid ammonia, ammonium cyanide is formed apparently and may be considered as the reacting cyanogen salt. The operation may be thus conducted satisfactorily by preparing two solutions, one consisting of the metal salt dissolved in anhydrous liquid ammonia and the other consisting of anhydrous liquid ammonia to which hydrocyanic acid has been added. When the two solutions are combined a double decomposition occurs and a precipitate is formed. The precipitate can be filtered from the solution and then dried by evaporating the ammonia which adheres to it. The drying should be conducted preferably out of contact with air. If a product of greater purity is desired the adhering solution can be replaced by washing the preciptate with anhydrous ammonia before drying.

It is not essential that the ammonia used as a solvent be strictly anhydrous as I have experienced no difficulty in using ammonia which contained a small amount of water. Likewise it is possible to employ calcium salts which contain water of crystallization. This water is liberated during the reaction but does not interfere with the production of the cyanide.

In carrying out the process the acid radical of the salt used combines with ammonia in the mother liquor. Thus, if calcium nitrate is used the liquor contains ammonium nitrate. The liquor can be evaporated to recover the free ammonia and to deposit the ammonium salt, for example, ammonium nitrate. This salt can be utilized as a by-product for fertilizing or other uses. It can be decomposed also by the addition of calcium oxide or hydroxide to regenerate the ammonia and the calcium salt, for example, calcium nitrate. Both of these products can be returned to the process, thus providing a cyclic operation in which all of the materials entering the reaction are withdrawn either as the cyanide product or re-used to generate that product.

As an example of the application of the process I placed about 150 c. c. of commercial anhydrous liquid ammonia in a Dewar test tube and added 25 c. c. of hydrocyanic acid, thus forming a solution of ammonium cyanide. In another Dewar test tube 10 grams of calcium nitrate $$Ca(NO_3)_2.4H_2O$$

were dissolved in about 100 c. c. of commercial anhydrous liquid ammonia. The ammonium cyanide solution was then added to the calcium nitrate solution until precipitation ceased. The precipitate was filtered with the aid of suction, washed with 50 c. c. of anhydrous liquid ammonia and placed in a 150 c. c. Erlenmeyer flask. The flask was immersed in a beaker of water at 40° C. and the precipitate was dried under 26 inches of vacuum for one hour. I thus obtained about 3 grams of the product showing by analysis

| | Per cent. |
|---|---|
| Ca | 32.6 |
| CN | 39.8 |
| $NH_3$ | 27.1 |

The analysis of the product as obtained in the foregoing example and of numerous similar products produced by the repeated operation of the process indicates that the product is a definite chemical compound having the formula $$Ca(CN)_2.2NH_3$$

It appears probable that the proportion of combined ammonia may vary somewhat depending upon the conditions attending the reaction. The product may, therefore, have the formula $$Ca(CN)_2.y(NH_3)$$

The calcium cyanide product prepared as hereinbefore described consists when dry of minute white particles which are apparently crystalline. The product is readily soluble in water and in methyl alcohol and the solutions exhibit the usual reactions of calcium ions and of cyanogen ions and also the usual reactions of solutions of ammonia in these solvents. The product is stable when not exposed to the atmosphere. When so exposed the solid product decomposes and evolves a mixture of hydrocyanic acid and ammonia. Some ammonium cyanide may be formed but this substance is itself readily volatile and the amount formed does not interfere with the use of the product as a source of hydrocyanic acid for fumigating and similar purposes.

As an indication of the rate of decomposition of the product in the presence of the atmosphere I exposed layers of the product about one eighth inch in thickness to the atmosphere for periods indicated in the following table which gives the amounts of hydrocyanic acid evolved:

| Percentage of total cyanogen content evolved as HCN after exposure periods of— | | |
|---|---|---|
| 1 hr. | 2 hrs. | 4 hrs. |
| 22.2 | 55.8 | 99.0 |

I have also caused portions of the product to be exposed for a period of four days at the end of which time it was found that the residue still remained white after practically all of the cyanogen content had evolved in the form of hydrocyanic acid. This indicates that no polymerization of the hydrocyanic acid occurred since polymerized hydrocyanic acid is brown or black in color. It is characteristic of the product that even when exposed in layers of considerable thickness polymerization does not result from the decomposition. Consequently all of the hydrocyanic acid can be released and utilized for a useful purpose This characteristic is a distinct advantage of the product and distinguishes it from products containing hydrocyanic acid of combination which tend to polymerize when exposed to the atmosphere.

The calcium cyanide product as described herein is one of the most useful and is adapted for a wide variety of commercial uses because of its relatively low cost. It is possible that cyanide products of the other metals can be prepared similarly. Such compounds would have the general formula $$M(CN)_x.y(NH_3)$$

in which M is the metal. It is to be understood, therefore, that the invention comprehends the application of the process for the production of cyanide compounds of the metals and these several products.

Various changes can be made in the details of the operation and in the chemical composition of the products obtained without departing from the invention or sacrificing any of the advantages thereof.

I claim:—

1. As an article of manufacture the cyanide of calcium containing combined ammonia which decomposes in the presence of the atmosphere.

2. As an article of manufacture the compound having substantially the formula $$M(CN)_x y(NH_3).$$

3. As an article of manufacture the compound having substantially the formula $$Ca(CN)_2 y(NH_3).$$

4. As an article of manufacture the compound having substantially the formula $$Ca(CN)_2 \cdot 2(NH_3).$$

5. As an article of manufacture the compound containing a metal cyanide and combined ammonia which decomposes in the presence of the atmosphere.

6. As an article of manufacture, the compound containing an alkali earth metal cyanide and combined ammonia which decomposes in the presence of the atmosphere.

7. The process of producing metal cyanides, which comprises substituting the cyanogen radical for the acid radical of a salt of the metal dissolved in liquid ammonia and separating the precipitate from the solution.

8. The process of producing metal cyanides, which comprises dissolving a salt of the metal in liquid ammonia, introducing the cyanogen radical to the solution and separating the precipitate from the solution.

9. The process of producing metal cyanides, which comprises dissolving a salt of the metal in liquid ammonia, adding hydrocyanic acid to the solution and separating the precipitate from the solution.

10. The process of producing metal cyanides, which comprises dissolving a salt of the metal in liquid ammonia, adding hydrocyanic acid and ammonia to the solution and separating the precipitate from the solution.

11. The process of producing calcium cyanide, which comprises substituting the cyanogen radical for the acid radical of a calcium salt dissolved in liquid ammonia, and separating the precipitate from the solution.

12. The process of producing calcium cyanide, which comprises dissolving a calcium salt in liquid ammonia, introducing the cyanogen radical to the solution and separating the precipitate from the solution.

13. The process of producing calcium cyanide, which comprises dissolving a calcium salt in liquid ammonia, adding hydrocyanic acid to the solution and separating the precipitate from the solution.

14. The process of producing calcium cyanide, which comprises dissolving a calcium salt in liquid ammonia, adding hydrocyanic acid and ammonia to the solution and separating the precipitate from the solution.

15. The process of producing calcium cyanide, which comprises dissolving calcium nitrate in liquid ammonia, adding the cyanogen radical to the solution and separating the precipitate from the solution.

16. The process of producing calcium cyanide, which comprises dissolving calcium nitrate in liquid ammonia, adding hydrocyanic acid to the solution and separating the precipitate from the solution.

17. The process of producing calcium cyanide, which comprises dissolving a calcium salt in liquid ammonia, adding hydrocyanic acid to the solution, separating the precipitate from the solution, regenerating the calcium salt from the solution and returning it to the process.

18. The process of producing calcium cyanide, which comprises dissolving a calcium salt in liquid ammonia, adding hydrocyanic acid to the solution, separating the precipitate from the solution, subjecting the ammonium salt in the solution to the action of a calcium compound to regenerate the calcium salt and returning the calcium salt to the process.

In testimony whereof I affix my signature.

ROBERT W. POINDEXTER, Jr.